(12) United States Patent
Blumenstock et al.

(10) Patent No.: US 6,230,487 B1
(45) Date of Patent: May 15, 2001

(54) METHOD FOR REGENERATING A CATALYTIC CONVERTER

(75) Inventors: Andreas Blumenstock, Ludwigsburg; Klaus Winkler, Rutesheim, both of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/405,131

(22) Filed: Sep. 24, 1999

(30) Foreign Application Priority Data

Sep. 25, 1998 (DE) .............................................. 198 43 859

(51) Int. Cl.⁷ ........................................................ F01N 3/00
(52) U.S. Cl. .................................. 60/286; 60/277; 60/301
(58) Field of Search .............................. 60/277, 286, 301, 60/320

(56) References Cited

U.S. PATENT DOCUMENTS

| | | | |
|---|---|---|---|
| 5,402,641 | * | 4/1995 | Katoh et al. ............................ 60/277 |
| 5,655,363 | * | 8/1997 | Ito et al. ................................. 60/277 |
| 5,724,808 | * | 3/1998 | Ito et al. ................................. 60/277 |
| 5,743,084 | * | 4/1998 | Hepburn ................................. 60/277 |
| 5,850,735 | * | 12/1998 | Araki et al. ............................ 60/286 |
| 5,974,790 | * | 11/1999 | Adamczyk et al. .................... 60/277 |
| 5,974,791 | * | 11/1999 | Hirota et al. ........................... 60/286 |

OTHER PUBLICATIONS

"Exhaust Sulfur Oxide Measurement Using Air Dilution" by M. E. Griffing et al, SAE Paper 750697, Fuels and Lubricants Meeting, Houston, Texas, Jun. 1975.

* cited by examiner

Primary Examiner—Thomas Denion
Assistant Examiner—Tu M. Nguyen
(74) Attorney, Agent, or Firm—Walter Ottesen

(57) ABSTRACT

The disclosure is directed to a method for improving the exhaust-gas quality, which is reduced by sulfur influence, in combustion processes with exhaust-gas catalytic converters. In the method, the oxygen storage capability of the catalytic converter is determined and is compared to a threshold value. When there is a drop below the threshold value, the exhaust-gas temperature is increased and/or an exhaust-gas composition, which acts in a reducing manner, is generated forward of the catalytic converter.

3 Claims, 2 Drawing Sheets

METHOD FOR REGENERATING A CATALYTIC CONVERTER

FIELD OF THE INVENTION

The invention relates to the regeneration of a three-way storage catalytic converter or a NOx-storage catalytic converter. The exhaust-gas quality of present day spark-ignition engines is determined by the converting power of the exhaust-gas catalytic converter. This is so in lambda=1 operation as well as in lean operation as is typical for gasoline direct injected engines.

BACKGROUND OF THE INVENTION

The conversion capacity can drop reversibly as well as irreversibly. It has been observed that sulfur intakes into the catalytic converter reduce the conversion capacity thereof. These sulfur intakes are caused by the sulfur components of the fuel. The intakes are dependent upon temperature and can be again released during operation of the engine. In this connection, reference can be made to SAE Paper 750697. The sulfur content in the fuel can fluctuate in dependence upon a fuel oil company (and/or the particular state in the United States of America). The fluctuation can be between 15 ppm and 1,000 ppm. It is therefore of interest not to deteriorate the exhaust gas notwithstanding an operation with fuel having a large sulfur content.

SUMMARY OF THE INVENTION

It is an object of the invention to provide a method which permits a regeneration of catalytic converters in the operation of internal combustion engines with the least possible disturbing side effects such as the formation of odors, the increase in fuel consumption or a deterioration in the driving comfort.

The method of the invention is for improving the quality of exhaust gas, which is reduced by the action of sulfur, in a combustion process with an exhaust-gas catalytic converter. The method includes the steps of: determining the oxygen storage capability of the catalytic converter; comparing the oxygen storage capability to a threshold value; and, if there is a drop below the threshold value, performing at least one of the following additional steps: increasing the temperature of the exhaust gas; and, generating an exhaust-gas composition forward of the catalytic converter which operates in a reducing manner.

According to a feature of the invention, a sulfur regeneration is carried out during operation with sulfur-containing fuel in order to free the catalytic converter of sulfur and to improve the quality of the exhaust gas.

The operation with sulfur-containing fuel can be determined via a reduction of the oxygen storage capability because the sulfur occupies the storage places in the catalytic converter which would otherwise be assumed by $O_2$ molecules. The oxygen storage capability can be determined by a conventional method for determining the oxygen storage capability of catalytic converters (catalytic converter diagnosis).

In the event that a first detection of the oxygen storage capability results in a reduced conversion or oxygen storage capability, a method for regenerating the catalytic converter is carried out. A regeneration of the catalytic converter of sulfur takes place at high temperatures and with a slightly rich mixture ($\lambda$<1). There are various possibilities to carry out the sulfur regeneration and three such possibilities are presented below:

(a) artificially reducing the efficiency of the engine, for example, by retarded ignition angles. This leads to a high exhaust-gas temperature. The sulfur can be regenerated with a simultaneously rich mixture. Advantageously, the enrichment is so matched to the ignition angle shift that the mutually opposed influences on the engine torque of the two measures compensate. An advantage of this possibility lies in the fact that it can be executed at any time.

(b) another possibility involves waiting for an operating point having a high air mass throughput of the engine (for example, full load). In this way, high catalytic converter temperatures are obtained. An enrichment of the mixture takes place in many engines at high load in order to protect components. In this way, an automatic sulfur regeneration results.

(c) Another possibility provides for charging the catalytic converter to a maximum with oxygen during overrun operation with the fuel metering switched off. When fuel metering is resumed, a slight mixture enrichment takes place in order to remove excess oxygen from the catalytic converter. If the ignition angle is now made to be retarded, the sulfur can here also be regenerated. The regeneration strategy in accordance with the invention can, for example, at the start of a trip, provide a catalytic converter diagnosis to determine the oxygen storage capability of the catalytic converter. If the oxygen storage capability lies above a predetermined threshold, then no further measures are taken. If the oxygen storage capability lies below a threshold, then a sulfur regeneration takes place with a subsequent renewed catalytic converter diagnosis.

If the oxygen storage capability then still lies below a threshold value, then an irreversible damage to the catalytic converter by deterioration has to be assumed. No further measures then take place with respect to the regeneration strategy. If the oxygen storage capability improves by the regeneration, then a reversible sulfur poisoning is present. In this case, a counter is started which defines a measure for the sulfur introduced. As a measure, the quotient of the consumed fuel and the engine efficiency is considered. The engine efficiency results from the operating parameters which are present in the control apparatus and is therefore known in principle. A higher efficiency reduces the quotient. This considers the situation that a certain regeneration is associated with high load conditions. A renewed diagnosis is undertaken when the counter has reached a predetermined value Z1. In the case that the oxygen storage capability has again dropped, a renewed sulfur regeneration is carried out. The counter z(S) is reset and the next diagnosis with sulfur regeneration is carried out before the value Z1 is reached. In the event that the oxygen storage capability has not dropped when reaching the value Z1, the next diagnosis with sulfur regeneration is carried out only after a longer time span (for example, after Z1+offset). In this way, an automatic adaptation of the distances between the regeneration phases takes place to the actual requirement determined by the characteristics of the catalytic converter and the sulfur content of the fuel.

BRIEF DESCRIPTION OF THE DRAWINGS

The invention will now be explained with reference to the drawings wherein.

DESCRIPTION OF THE PREFERRED EMBODIMENTS OF THE INVENTION

Figure 1:
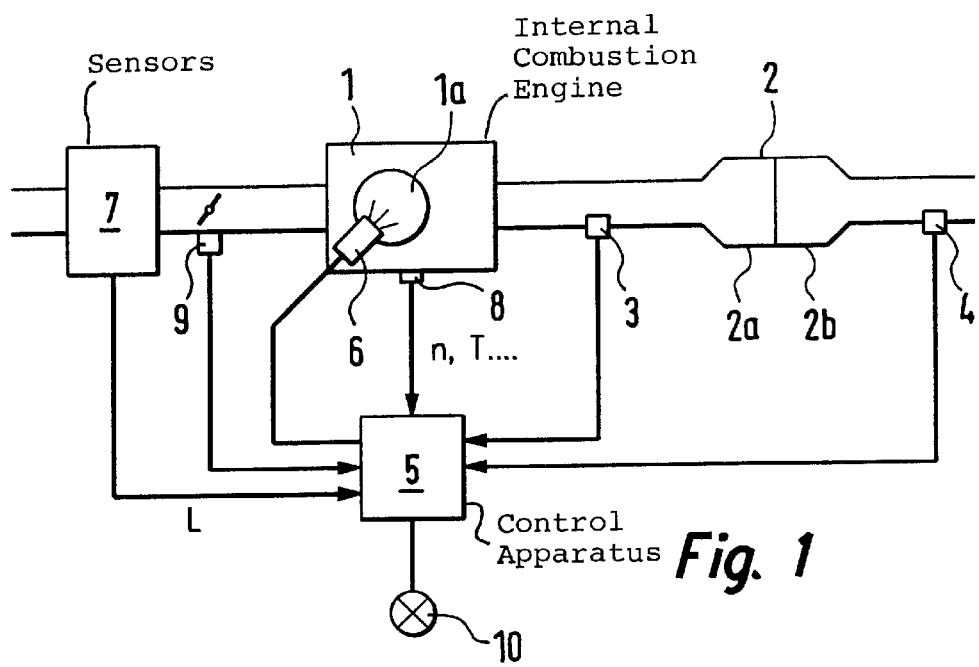
FIG. 1 is a block diagram showing the technical background of the invention.

FIG. 1 shows an internal combustion engine 1 having a catalytic converter 2, exhaust-gas probes 3 and 4, a control apparatus 5, a fuel-metering device 6 and various sensors (7, 8, 9) for load L, rpm n as well as further operating parameters of the engine, as needed, such as temperature, throttle flap position, et cetera. The catalytic converter includes a first part 2a and a second part 2b. Part 2a represents the NOx storage catalytic converter and part 2b represents an integrated or downstream oxygen storage. The invention is, however, also applicable to a three-way catalytic converter wherein the region 2a as well as the region 2b represent respective oxygen storages.

From the above-mentioned input signals, the control apparatus forms, inter alia, fuel-metering signals with which th device 6 for metering fuel is driven. The fuel-metering device can be configured for a so-called intake manifold injection as well as for a gasoline direct injection into the combustion chambers 1a of the individual cylinders. The variation of the mixture composition can take place via a change of the injection pulse widths with which the fuel-metering device is driven. The essence of the method of the invention primarily concerns the following: the control apparatus 5, the exhaust-gas probe 4 mounted rearward of the catalytic converter as well as the means 10 for providing an indication and/or a storage of data as to the storage capability.

Figure 2:
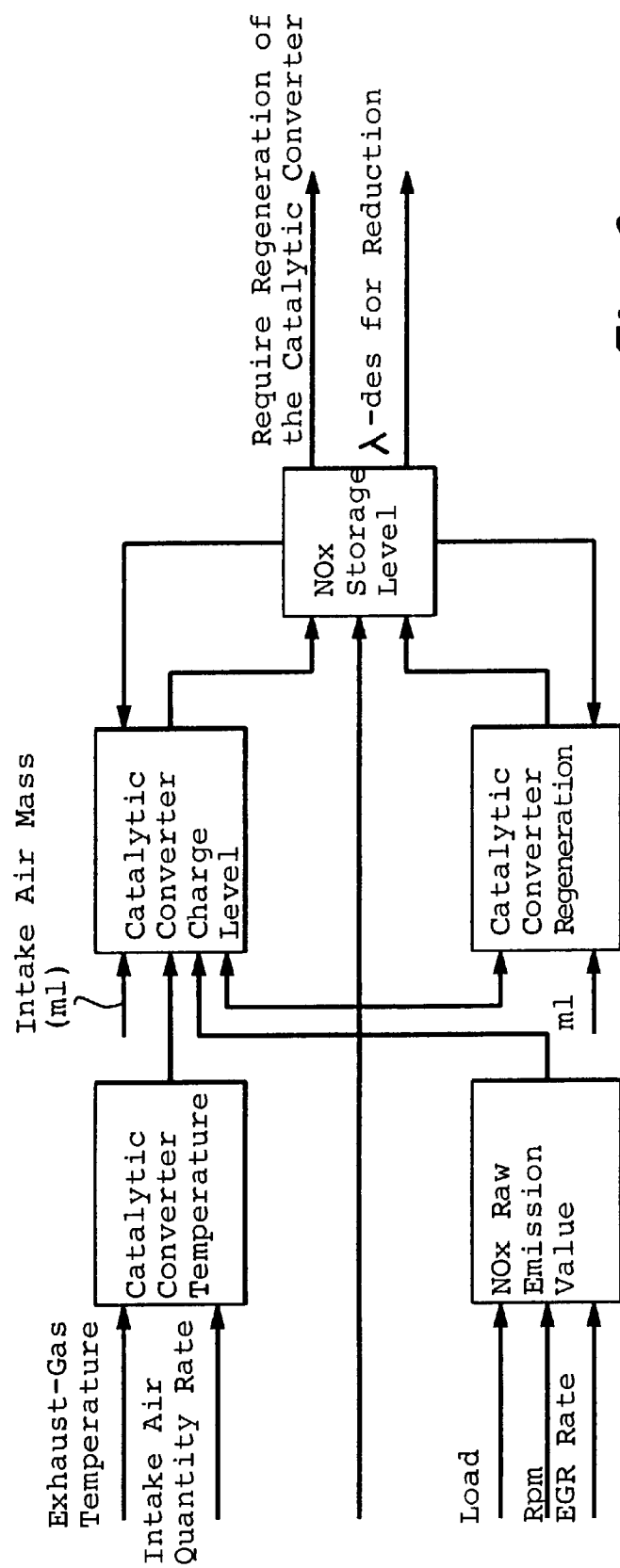
FIG. 2 is a block diagram showing the principle of an NOx mixture control for an NOx catalytic converter.

FIG. 2 shows the principle of a mixture control for an NOx catalytic converter. The control of the NOx storage catalytic converter is based on a continuously executed model-supported computation in the control apparatus which supplies the actual degree of charge of the catalytic converter with nitrogen.

The catalytic converter temperature is modeled with access to the exhaust-gas temperature and the measured rate of intake air quantity. The NOx raw emission of the engine is to be detected for stratified and homogeneous lean operation as follows: in the operation with stratified charge, an NOx raw emission value is obtained with access to a characteristic field addressable by load and rpm. This value is corrected by the exhaust-gas recirculation rate. In homogeneous lambda operation, a supplemented correction takes place which considers the lambda value.

In lean operation, the actual charge rate is determined in that the NOx raw emissions are evaluated relative to the intake air mass and the temperature of the catalytic converter and are subsequently integrated. The charge rate correlates with the NOx emissions rearward of the catalytic converter. The NOx emissions increase approximately linearly with an increasing degree or level of charge. When a predetermined value for the NOx emission is reached rearward of the catalytic converter (which can be estimated via a threshold value for the degree of charge), the storage process is ended and a switchover to a richer mixture is made for the purpose of regenerating the NOx storage catalytic converter.

The regeneration phase is carried out in a similar manner with the support of a model so that the reducing agent quantity, which is necessary for the regeneration of the storage, is computed in dependence upon the rich lambda value and the quantity of the inducted air.

The above-mentioned control strategy can be supported by an NOx sensor mounted rearward of the catalytic converter. This sensor can check whether the model-supported determination of the degree of charge is correct. The model parameters are correct when the time up to reaching a threshold value corresponds to the model. If the threshold value is reached sooner as a consequence of a deterioration of the catalytic converter, then this permits a conclusion to be drawn as to a reduced storage capacity.

This information can be used for detecting a sulfur poisoning. If the storage capacity drops below a predetermined threshold value, then the attempt of a regeneration of the storage takes place.

If the storage capacity continues to remain below the threshold value, this shows an irreversible damage of the catalytic converter. Correspondingly, the fault lamp is switched on in this case.

For the case that NOx sensors having a high measuring precision and the long-term stability, which is necessary for motor vehicle applications, are not present, then other means have to be found.

Ways were sought in order to be able to monitor the NOx storage catalytic converter with conventional sensor technology The use of a proven two-point sensor is especially advantageous for reasons of cost. In contrast to the NOx sensor, the two-point oxygen sensor supplies no signal which provides useful information in the area of lean air/fuel mixtures. Only complete fillings and emptyings of the catalytic converter lead to changes of the signal level which provide information. This can then be used as follows: the time with a rich control is lengthened until the rearward probe reacts. Knowing the intake air quantity and the lambda value, the sum of oxygen and NOx storage capability can be derived from the total regeneration time. For a defined catalytic converter type, it is possible to provide the portion of the NOx storage capacity of the measured total capacity. This is based on the assumption of a uniform deterioration of the NOx storage and of the oxygen storage in the catalytic converter. In this way, it is possible to detect changes in the NOx storage capability.

If the total storage capability has dropped impermissibly, sulfur regeneration must be carried out. An irreversible damage must be assumed when the total storage capacity cannot be restored even after repeated attempts at regeneration.

Experience has shown that fuels having approximately 150 ppm by weight lead maximally once per tank filling to a sulfur poisoning which makes a sulfur regeneration necessary.

The conditions for a sulfur regeneration can be forced by switchover to homogeneous operation (homogeneous mixture distribution in the combustion chamber, stoichiometric or rich mixture) in combination with a retardation of the ignition. The retardation heats the exhaust gas in the wanted manner. In association therewith, the efficiency of the engine deteriorates and the torque drops. Advantageously, the retardation takes place such that the torque drop associated therewith compensates the torque increase which is connected to the changeover to homogeneous operation.

Stored sulfur occupies the storage locations in which otherwise oxygen is stored, The sulfur can again be removed from the catalytic converter by stoichiometric or rich mixture ($\lambda<1$) and high temperatures. High exhaust-gas temperatures are achieved in a spark ignition engine by retarding the ignition angle. For a diesel engine, a late displacement of the ignition start can be applied.

A check of the operability of the catalytic converter is made. Checks of this kind are described in United States patent application serial number 09/234,118, filed Jan. 19, 1999, and U.S. patent application Ser. No. 09/234,219, filed Jan. 19, 1999. These patent applications are incorporated herein by reference with respect to the check of the operability.

Figure 3A:
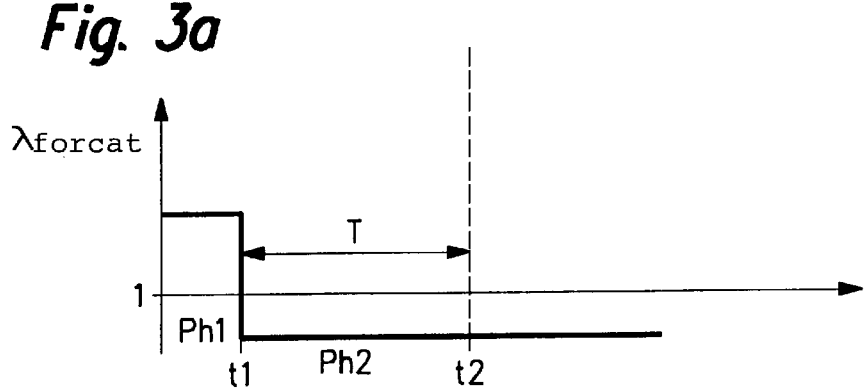
FIG. 3a is a plot of the change in the mixture composition forward of the catalytic converter plotted as a function of time; and, FIG. 3b shows a plot of the signal Us of the rearward exhaust-gas probe 4 for an embodiment of the invention.
Figure 3B:
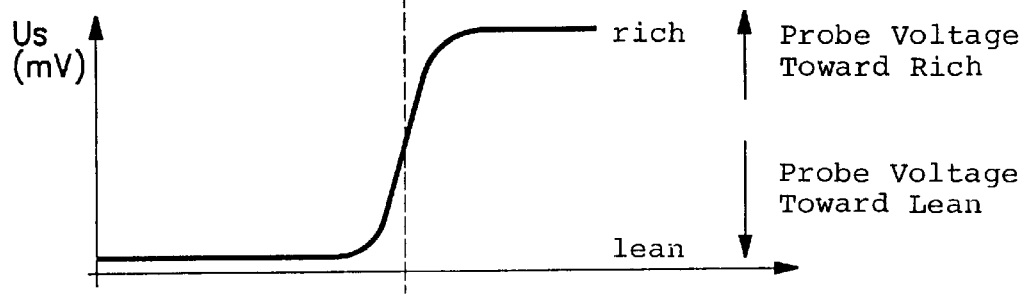

An example of a check is provided in FIGS. 3a and 3b herein.

FIGS. 3a and 3b show the change in the mixture composition forward of the catalytic converter (FIG. 3a) together with the signal us of the rearward exhaust-gas probe 4 (see FIG. 3b) in one embodiment of the invention.

In a first phase Ph1, the engine is operated with $\lambda>1$, that is, there is an air excess. The low signal level of the rearward probe in FIG. 3b shows that an air or oxygen excess is present even rearward of the catalytic converter. In a second phase Ph2 at time point t1, the mixture composition of ($\lambda>1$) switches over to a mixture composition of ($\lambda<1$), that is, an oxygen deficiency. At time point t2, the rearward sensor 4 reacts to the oxygen deficiency with an increase of its signal from a low level to the high level. The time duration T=(t2−t1) is an index for the sum of the NOx and the oxygen storage capability of the catalytic converter system. Stated otherwise, the time T is a quantity suitable for quantitative evaluation. As shown in FIG. 3b, the time point t2 can be determined, for example, when the signal of the rearward probe exceeds a threshold value.

The time t1 can be detected directly in the control apparatus. For a jump-like reversal of lambda, t1 is that time point starting from which the injection pulsewidths are increased. In this case, t1 is still burdened with the inaccuracy of the gas-running time between the start of the injection and the time point at which the combustion products reach the catalytic converter. This time is, however, small compared to the time T and can therefore be neglected in a first approximation. If a higher precision for the determination of the time point t1 is wanted, then the time point of the signal level change of the forward exhaust-gas probe 3 is used. The change of the mixture composition shown above leads to the condition that the internal combustion engine emits hydrocarbons and carbon monoxide as reducing agents. As an alternative to th emission of exhaust-gas components which act to reduce, the reducing agent can be supplied from a storage tank to the exhaust gas forward of the catalytic converter via a valve driven by the control apparatus. The engine can then be continuously operated with a lean mixture.

In the diagnosis, and depending upon circumstances, one can distinguish between (a) engines in $\lambda=1$ operation and (b) engines in lean operation and especially engines having gasoline direct injection.

(a) For motor vehicles having a conventional $\lambda=1$ system, the most conventional monitoring method is to determine the rate of conversion of the three-way catalytic converter via its oxygen storage capacity. Here, the interrelationship is present that the rate of conversion and the oxygen storage capacity drop with the rate of deterioration of the catalytic converter.

After a first diagnosis, which does not provide an adequate operability, a sulfur regeneration phase as described above is initiated. Thereafter, a renewed diagnosis is carried out.

(b) For vehicles having a lean engine operation $\lambda>1$ (lean mixture, gasoline direct injection), the three-way catalytic converter no longer satisfies the requirements as to the exhaust-gas quality. The utilized storage catalytic converter stores NOx emissions during lean operation. Stored nitrate is released and $N_2$ is reduced during "rich" engine operation. Thereafter, the NOx storage is again ready to receive.

In a manner similar to the three-way catalytic converter, a shortening of the time span T for regeneration of the storage catalytic converter can be evaluated because, in the deteriorated state, less NOx emissions can be stored and the requirement as to a reducing agent is less. The reduced NOx storage capacity can here too be attributed to a reversible sulfur poisoning and can be eliminated by suitable measures.

The NOx storage capacity is determined by the state of deterioration and the state of poisoning of the catalytic converter. For a deteriorated catalytic converter, the active storage material is damaged and less NOx emissions can be store (increase of the NOx emission trace rearward of the catalytic converter is greater).

Schematically, the storage can be defined by the following reaction equation:

$$BaO+2NO_2+0.5O_2 \rightarrow Ba(NO_3)_2 \quad (1)$$

Here, barium oxide as a storage material is presented as representative.

The sulfur content which is present in the fuel, occurs in the form of $SO_2$ in the exhaust gas and substitutes the $NO_2$ in the NOx catalytic converter. This means that, in addition to the nitrates, sulfates occupy the storage locations in the NOx catalytic converter. The stored sulfates are substantially more stable and are not released with the standard regeneration and continue to occupy the storage locations. The above-described catalytic converter diagnosis recognizes this poisoning occurrence (T becomes less, the needed reducing agent becomes less because less NOx can be stored). If the catalytic converter is recognized as being defective from the catalytic converter diagnosis, a check must first be made as to whether the defect occurs because of sulfur poisoning. This means that, after the diagnostic function has started, the engine must be brought into an operating state which reliably drives out the sulfur.

Thereafter, the storage locations occupied by the sulfur are again free and the diagnostic function recognizes the storage catalytic converter as being acceptable (sufficient NOx storage capacity).

It has been shown to be especially advantageous to select the operating state of the engine for sulfur regeneration so that a temperature in the catalytic converter of Tcat>650° C. and a $\lambda=0.98$ is ensured for a time duration of 60 to 120 seconds, example, by retarding the ignition angle with simultaneous enrichment. The time duration for the sulfur regeneration adapts, in each case, so that the catalytic converter is reliably free of sulfur. The lambda value 0.98 leads to a minimization of the formation of odors in comparison to other lambda values for the sulfur regeneration.

It is understood that the foregoing description is that of the preferred embodiments of the invention and that various changes and modifications may be made thereto without departing from the spirit and scope of the invention as defined in the appended claims.

What is claimed is:

1. A method for regenerating a storage catalytic converter including a three-way storage catalytic converter and a NOx-storage catalytic converter in the operation of an internal combustion engine, the method being for carrying out a sulfur regeneration for freeing the catalytic converter of sulfur and improve the quality of the exhaust gas during operation of the engine with sulfur containing fuel, the method comprising the steps of:

determining an operation of said engine with sulfur containing fuel from a reduction of the oxygen storage capacity of said catalytic converter;

when a first determination of said oxygen storage capacity yields a reduced oxygen storage capacity, regenerating said catalytic converter and then again detecting the oxygen storage capacity:

when the oxygen storage capacity has improved because of the regeneration, starting a counter which defines an index for the introduced sulfur;

undertaking a renewed diagnosis when said counter has reached a predetermined value Z1;

when the oxygen storage capacity has again been reduced, carrying out a renewed sulfur regeneration and again resetting said counter and reducing said predetermined value Z1; and, if the oxygen storage capacity has not yet become less whe said value of Z1 is reached, carrying out the next diagnosis with sulfur regeneration only after a longer time span has elapsed.

2. The method of claim 1, wherein at least one of the following quantities is used when forming said index: fuel consumption, engine efficiency and air-fuel ratio.

3. The method of claim 1, wherein said time span is approximately Z1 plus an offset.

* * * * *

UNITED STATES PATENT AND TRADEMARK OFFICE
CERTIFICATE OF CORRECTION

PATENT NO.   : 6,230,487 B1
DATED        : May 15, 2001
INVENTOR(S)  : Andreas Blumenstock and Klaus Winkler It is certified that error appears in the above-identified patent and that said Letters Patent is hereby corrected as shown below:

Column 8,
Line 4, delete "whe" and substitute -- when -- therefor.

Signed and Sealed this

Fourth Day of March, 2003

JAMES E. ROGAN
*Director of the United States Patent and Trademark Office*